United States Patent
Kirkevold et al.

(10) Patent No.: US 6,263,322 B1
(45) Date of Patent: Jul. 17, 2001

(54) INTEGRATED AUTOMOTIVE SERVICE SYSTEM AND METHOD

(75) Inventors: Tom Kirkevold; Mark Erdrich, both of Elk Grove, CA (US); Steven F. Johnson, Kalamazoo, MI (US); Scott E. McIntyre, Carpinteria; Robert J. Pfistor, Santa Barbara, both of CA (US); Nicholas J. Colarelli, Creve Coeur, MO (US); Timothy A. Larson, Ferguson, MO (US); Timothy A. Strege, Ballwin, MO (US); Arthur J. Blumenthal, West Chester, PA (US); Christopher H. Johnson, Valley Park, MO (US); Ken Brookings, Sandpoint, ID (US); Roger Butler, Allentown, PA (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/111,024

(22) Filed: Jul. 7, 1998

(51) Int. Cl.[7] ............................................... G06F 17/60
(52) U.S. Cl. ........................ 705/400; 707/104; 707/500
(58) Field of Search .............................. 73/117.2, 117.3, 73/121; 340/820.28; 700/90; 705/1, 16, 30, 400; 707/1, 10, 104, 500, 501, 513

(56) References Cited

U.S. PATENT DOCUMENTS 4,404,639 * 9/1983 McGuire et al. ....................... 701/35
4,441,359 * 4/1984 Ezoe ...................................... 73/117

(List continued on next page.)

FOREIGN PATENT DOCUMENTS 10-39981 * 2/1998 (JP) .
11-136355 * 5/1999 (JP) .
WO 99/65681 * 12/1999 (WO) .

OTHER PUBLICATIONS

Donohue: "Estimating for small buliders: three custom builders talk about how their estimates help controll costs, schedule jobs, and manage the entire home building process"; Aug. 1992, Builder, v15, n9, p. 95.*

Primary Examiner—Edward R. Cosimano
(74) Attorney, Agent, or Firm—Polster, Lieder, Woodruff & Lucchesi, L.C.

(57) ABSTRACT

An integrated automotive repair shop network is designed to greatly enhance the efficiency and quality of diagnostic and repair work performed in an automotive repair shop. The network employs a data entry terminal for the entry of routine customer information into a shop management system, including the identification of the vehicle to undergo diagnosis or repair. The shop management system is configured to generate an appropriate repair order. Computerized diagnostic and repair devices linked through the network to the shop management system are configured to access the customer information contained in the repair orders, as well as to extract relevant technical specifications, service bulletins, parts listings, and prior services records from interconnected information databases. Each computerized diagnostic and repair device provides updated information to the repair shop management system upon the completion of a diagnostic routine, enabling other computerized diagnostic and repair devices to access the most current vehicle parameters. Completed repair orders are stored in a customer information database for rapid retrieval and display of the prior work history for each vehicle serviced.

13 Claims, 3 Drawing Sheets

U.S. PATENT DOCUMENTS

| | | | |
|---|---|---|---|
| 4,757,463 | * | 7/1988 | Ballou et al. .......................... 701/35 |
| 4,967,381 | * | 10/1990 | Lane et al. ............................. 702/81 |
| 5,128,859 | * | 7/1992 | Carbone et al. ........................ 705/4 |
| 5,239,486 | * | 8/1993 | Motier .................................. 702/184 |
| 5,317,503 | * | 5/1994 | Inoue .................................... 700/90 |
| 5,377,098 | * | 12/1994 | Sakai ..................................... 705/29 |
| 5,432,904 | * | 7/1995 | Wong ..................................... 705/4 |
| 5,657,233 | * | 8/1997 | Cherrington et al. ............... 705/400 |
| 5,717,595 | * | 2/1998 | Cherrington et al. ............... 705/400 |
| 5,893,082 | * | 4/1999 | McCormick ........................ 705/400 |

* cited by examiner

INTEGRATED AUTOMOTIVE SERVICE SYSTEM AND METHOD

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to automotive repair shops and dealerships, and more particularly to the networking of computerized automotive repair and diagnostic equipment with multiple informational databases and management systems to provide an integrated repair shop environment wherein information may be exchanged between the interconnected equipment, databases, and management systems.

With the ever increasing complexity of modem automobiles, the diagnosis and repair of automobile problems is becoming an ever more burdensome task. Not only must today's automotive technician be familiar with the basic components of an internal combustion engine, vehicle electronics, suspension systems, and wheel components, he must also be capable of utilizing computerized diagnostic and repair equipment to quickly and accurately locate and correct problems. Additionally, today's technicians are faced with an overwhelming variety of vehicles, each with different parts, systems, and features with which the technician must be familiar to effectively diagnose and repair problems.

Even at a dealership exclusively devoted to a single manufacturer's product line, technicians are faced with changes in vehicle systems and designs from one model year to the next. Traditionally, schematics and parts listings for various vehicles are maintained in repair shops on microfilm or in a printed format, bound in large binders and occasionally updated by technical service bulletins from the vehicle manufacturers. These binders are usually contained in a central location apart from the actual working area of the repair shop, and are subject to daily wear and tear. Updates to the binders must be manually inserted, and outdated material removed as appropriate, requiring a certain degree of diligence on the part of the operator for the contents to remain up to date.

A technician repairing a vehicle will often be required to use one set of binders to locate the steps or guidelines to follow for repairing or replacing a particular component, and a second set of binders to locate the appropriate stock numbers for replacement components. Finally, upon the completion of a repair, the technician is required to either write down the repair performed, along with the parts used and prices thereof, or to manually enter this information into a data terminal connected to a central computer system for producing a customer invoice.

Much of the diagnostic and repair equipment employed by technicians in automotive repair shops already provides at least a limited computer processing capability. For example, automotive alignment equipment, engine analyzer machines, and hand-held testers typically incorporate computerized display terminals for aiding the technician in performing his job, and for displaying the results of a completed task. Measuring devices for determining the thickness of brake rotors or drums typically include digital sensors capable of producing highly accurate measurements. These computerized devices are often capable of displaying manufacturer's tolerances and specifications for the vehicle being tested if they are provided with the proper identifying information, such as the vehicle make, model, and year. Traditionally, this information must be entered by the technicians operating each diagnostic and repair machine, leading to a large number of redundant data entry operations. Furthermore, many computerized diagnostic and repair devices from different manufacturers often require the same information to be entered by the operator in different formats.

Much of the data redundantly entered by technicians employing current computerized repair and diagnostic devices is already available in the repair shop's customer files or repair order tracking system. Customer information, including the vehicle make, model, and year is recorded each time a vehicle is brought in for service. This information is used to print out a repair order associated with the vehicle, and for customer billing purposes.

Some existing repair shop systems such as the one disclosed in U.S. Pat. No. 5,657,233 for an "Integrated Automated Vehicle Analysis" issued to Cherrington, et al. attempt to overcome some of the problems described above by providing some interconnection between computerized point-of-sale systems, technician's terminals, and informational databases. However, the system disclosed in U.S. Pat. No. 5,657,233 is directed towards the standardization of inspection procedures for various vehicle problems, and is accordingly inflexible in its operation. Furthermore, the '233 system fails to fully utilize the available information related to each vehicle undergoing diagnostic procedures or repairs. Technicians employing the '233 system are required to continually re-enter customer data, including the vehicle make, model, and year each time a new diagnostic procedure is begun, and are often restricted to following a hierarchical series of inspection steps or guidelines.

Another repair shop integration system, referred to as the "CAS" system, was implemented on a limited basis by Computer Aided Service, Inc. of San Jose, Calif. The CAS system interconnected a small number of specialized computerized repair and diagnostic devices with a centralized repair shop computer over a commercially available network, using the standard network protocols. This allowed technicians operating the computerized repair and diagnostic devices to retrieve and update repair order information stored on the centralized repair shop computer by remotely accessing the shop computer programs and databases over the network. While providing the appearance of an integrated system, CAS is more accurately described as a remote access system, with a centralized data store for maintaining customer records and information.

From the above, it is apparent that tremendous gains in the efficiency and quality of the diagnosis and repair of automobiles could be achieved through the networking and fully standardized integration of the many computerized repair, diagnostic, and informational systems presently employed in various repair shop procedures.

SUMMARY OF THE INVENTION

Among the several objects and advantages of the present invention are:

The provision of an integrated automotive repair shop network which includes standardized intercommunication between computerized repair, diagnostic, and shop management systems;

The provision of the aforementioned integrated automotive repair shop network which includes interconnected informational databases capable of transferring data to the computerized repair, diagnostic, and shop management systems;

The provision of the aforementioned integrated automotive repair shop network which reduces the need for redundant entry of duplicate information;

The provision of the aforementioned integrated automotive repair shop network which facilitates the rapid retrieval of current technical information relevant to the diagnosis and repair of a vehicle;

The provision of the aforementioned integrated automotive repair shop network which is a standardized open-architecture, capable of integrating additional computerized devices;

The provision of the aforementioned integrated automotive repair shop network to incorporate computerized devices from different manufacturers which employ a standardized interface protocol;

The provision of the aforementioned integrated automotive repair shop network which includes the electronic transfer of data between computerized devices;

The provision of the aforementioned integrated automotive repair shop network which includes the standardized transfer of software object modules to facilitate the display of diagnostic results data; and The provision of the aforementioned integrated automotive repair shop network which is not dependent upon the data format of diagnostic results transferred between the computerized diagnostic devices and stored in the informational databases.

Briefly stated, the integrated automotive repair shop network of the present invention is designed to greatly enhance the efficiency and quality of diagnostic and repair work performed in an automotive repair shop. The network employs data entry terminals for the entry of routine customer information, including the identification of vehicles to undergo diagnosis or repair. A repair shop management system is configured to receive the customer information and generate an appropriate repair order, including a list of repair tasks to be completed. Each computerized diagnostic and repair devices linked to the network is configured with a network interface to access the customer information over the network, as well as to extract relevant technical specifications, service bulletins, parts listings, and prior services records from interconnected information databases as needed. Each computerized diagnostic and repair device provides through the network interface, updated information to the repair shop management system upon the completion of a diagnostic routine, enabling other computerized diagnostic and repair devices to access the most current vehicle parameters. Diagnostic data and completed repair information from one computerized diagnostic or repair device may be printed at, or displayed and viewed on a second repair device or on the repair shop management system through the network interface, which allows the repair device which generated the data to control a portion of the display on the second repair device or repair shop management system. The second device or repair shop management system allocates a portion of an associated display for data display, and then receives, through the network, software object modules from the data generating device which contain the necessary code to interpret and display the data. In addition to being displayed, completed repair orders are stored in a customer information database by the shop management system, allowing rapid retrieval, future display, and printouts of the prior work history for each vehicle serviced.

The foregoing and other objects, features, and advantages of the invention as well as presently preferred embodiments thereof will become more apparent from the reading of the following description in connection with the accompanying drawings.

BRIEF DESCRIPTION OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description will clearly enable one skilled in the art to make and use the invention, describes several embodiments, adaptations, variations, alternatives, and uses of the invention, including what we presently believe is the best mode of carrying out the invention.

Figure 1:
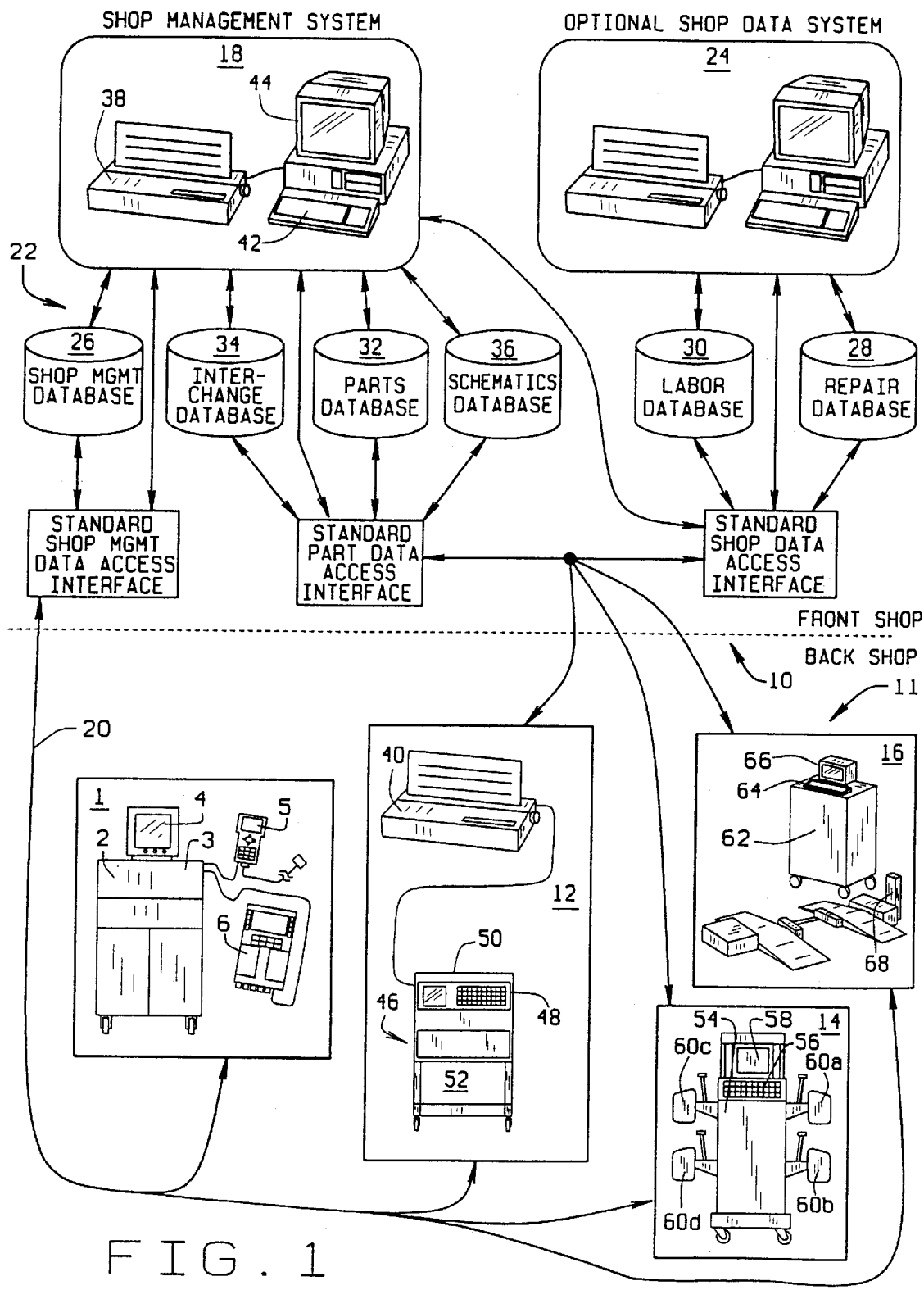
FIG. 1 is a schematic diagram of the networked components of the integrated automotive repair shop system.

Referring to FIG. 1, the components of one embodiment of the integrated automotive repair shop system of the present invention are shown generally at 10. Computerized diagnostic and repair devices, indicated generally at 11, and including in the embodiment described herein a computerized engine analyzer 12, a computerized diagnostic system 1, a computerized wheel alignment system 14, and a computerized brake diagnostic system 16, each configured with a network interface, are linked to each other and to a shop management computer 18 over a network 20. Informational databases 22, stored either on the shop management computer, or on remote computer systems 24 configured with a network interface are additionally linked to the network. The information databases 22 include a shop management database 26, a repair database 28, a labor database 30, a parts database 32, an interchange database 34, and a schematics database 36. While the embodiment described here is limited to a few computerized repair or diagnostic devices, one skilled in the art will recognize that the broader concepts of this invention are not so restrictive, and that additional computerized repair or diagnostic devices and databases configured with the network interface described herein may be added to the network.

In the embodiment shown in FIG. 1, the shop management computer 18 is further linked, via the Internet or other direct data connection, to remote components (not shown) such as vendor databases located offsite. Coupled to the shop management computer 18 is a repair order printer 38. In addition to the repair order printer 38, the integrated automotive repair shop network 20 may include one or more diagnostic report printers 40 linked directly to the individual computerized diagnostic or repair components.

Generally located in the front office area of an automotive repair shop, the shop management computer 18 includes a conventional keyboard 42 for data input and a video display 44 such as a cathode ray tube (CRT). The shop management computer 18 is modified with a shop management program and a network interface which allows the shop management computer 18 to interact with the networked computerized diagnostic and repair systems 11 and with the electronic information databases 22. These interactions are set forth in detail below.

Interactions between the shop management computer 18 and the computerized diagnostic and repair systems 11 occur through a network interface and are identified by repair order numbers and task identifiers. Each time a customer brings a vehicle to the repair shop for a diagnosis or repair, an operator inputs the relevant customer information into the shop management computer 18. The input of the customer information is preferably done by direct entry on the keyboard, however, one skilled in the art will recognize that information may be input to the system by means of a menu selection system or other input device such as a scanner or bar code reader. Relevant customer information may include, but is not limited to, the customer's name and address, and the vehicle identification number (VIN) or make, model, and year of the vehicle being brought in for service. Once the initial data entry has been completed by the operator, the shop management computer 18 generates an electronic repair order record. Each time a vehicle is brought in for service it is assigned a repair order number by the shop management computer 18, and each diagnostic procedure or repair task to be performed on the vehicle is similarly assigned a task identifier, and associated with that repair order number. The repair order number and task identifiers are linked with the customer data in the electronic repair order record, and stored electronically in the shop management computer 18.

Repair order numbers and task identifiers are utilized by the various computerized diagnostic and repair systems linked to the shop management computer 18 through the network, to retrieve data relevant to the diagnostic procedure or repair to be performed. The computerized engine analyzer 12, the computerized diagnostic system 1, the computerized wheel alignment system 14, and the computerized brake diagnostic system 16, of the present embodiment each include a computer configured with a specialized program to perform the associated diagnostic or repair functions, and with a network interface program designed to interact with the other components of the integrated automotive repair shop system over the network.

The network interface programs provide each computerized diagnostic and repair system with a standardized set of function calls for transferring information. These standardized function calls, which comprise the core of the network interface for every computerized repair or diagnostic device linked to the network, are designed to transfer data to and from target computerized devices, such as the shop management computer or an informational database, and include the following operations:

Get Year Make Model Engine

Provided with a repair order number as input, this function call requests the target to return to the requesting device a data packet including the year, make, model, and engine information of the vehicle associated with the input repair order number. This information includes a description of the vehicle, and unique identification number are returned.

Get Customer Information

Provided with a repair order number as input, this function call requests the target to return to the requesting device a data packet including the customer information such as name, phone number, and current address, associated with the input repair order.

Get Repair Orders for a Customer/Vehicle

Provided with a unique customer identification number and or a unique vehicle identification number as input, this function call requests the target to return to the requesting device a data packet including a list of all repair orders associated with that customer or vehicle. A technician may use this information to determine if a particular service procedure has been previously performed for the customer or on the vehicle.

Get Repair Order Task List

Provided with a repair order number as input, this function call requests the target to return to the requesting device, a data packet including a list of all tasks associated with the input repair order number. This information is then used by the technician to determine if, for example, the vehicle's wheels are scheduled for balancing in conjunction with an alignment diagnosis, or if a previous repair order included a particular repair task or other repair procedure.

Get Task Assignment

Provided with a task identifier as input, this function call requests the target to return to the requesting device, a data packet including the service bay number to which the particular repair task is or was assigned.

Get Task Technician

Provided with a task identifier as input, this function call requests the target to return to the requesting device, a data packet including the name of the technician assigned to complete the particular task.

Get Pending Repair Orders

This function call requests the target to return to the requesting device, a data packet containing a list of repair orders currently pending in the system, including the task identifiers associated with each repair order.

Get Scheduled Vehicle Maintenance Info

Provided with a vehicle identification such as make, model, and year information as input, this function call requests the target to return to the requesting device, a data packet of information related to the vehicle manufacturer's maintenance schedule, including related part numbers and repair procedures.

Get Parts

Provided with task identifier and a vehicle identification, this function requests an informational database return, to the requesting access program, a listing of the needed parts, including part descriptions, part identification numbers, and current prices.

Get Part Info

Provided with a task identifier and vehicle identification as input, this function call requests the target to return to the requesting device, a data packet containing a list of part availability for the parts associated with the identified task and vehicle in the shop inventory, including ordering information for out-of-stock parts.

Request Part Order

Provided with a part identification number as input, this function call requests that target place an order for an out-of-stock part.

Request Part Delivery Schedule

Provided with a part identification number for an ordered out-of-stock part as input, this function call requests that the target return a data packet to the requesting device which includes the delivery schedule for the ordered part.

Get Repair Doc List

Provided with a vehicle identification number as input, this function call requests a target to provide the requesting device with a data packet containing a list of the identified diagnostic and repair documents available for the identified vehicle.

Get Repair Doc

Provided with an identification for a diagnostic or repair document as input, this function call requests the target to provide the requesting device with a specific repair document. The document may then be either printed or displayed for the technician to view.

Get TSB List

Provided with a vehicle identification number as input, this function call requests the target to return to the requesting device a data packet containing a list of identified technical service bulletins available for the identified vehicle.

Get TSB

Provided with an identification for a technical service bulletin as input, this function call requests the target provide the requesting device with the identified technical service bulletin. The bulletin may then be either printed or displayed for the technician.

Get Labor

Provided with a task identifier as input, this function call requests a target to provide the requesting device with a data packet containing an estimate of the number of labor hours required to complete the identified task.

Get Repair Order Notes

Provided with a repair order number as input, this function call requests the target to return to the requesting device a data packet containing any comments or notes associated with the identified repair order. This function may be utilized to relay specific customer comments to the repair technicians, for example "Noise only when traveling at 32 mph." etc.

Signal Task Change

Upon completion of an identified task, the network interface signals the shop management computer the computerized device is ready to perform the next assigned task. Upon receiving this signal, the shop management computer requests, from the signaling network interface, a data packet containing the results of the completed task.

Erase Task Allowed

Upon completion of an identified task, the network interface requests permission from the shop management computer before the computerized device may discard the results of the completed task. Permission is granted only upon the successful completion of the data packet transfer associated with the Signal Task Change function call, containing the results of the completed task. This ensures that the shop management computer receives a copy of the results for storage prior to their being discarded.

Request Task Data Packet

Provided with a task identifier and a previously completed work order identifier, this function call requests the target provide to the requesting device a data packet containing the results of the previously completed task.

As will be set forth below, each network interface may, in addition to including the standardized functions set forth above, be modified to contain additional function calls specifically related to the operation of the specialized computerized diagnostic or repair system upon which it is running. Each network interface is configured to receive and respond to a standardized set of function calls, data packet requests, and display control allocations received from the shop management program set forth below. By requiring each computerized device connected to the network to provide at least this minimum standardized set of function calls in a network interface program, the integrated automotive repair shop system 10 sets forth an standardized protocol for integrating any number of computerized components. Components may be seamlessly added and removed from the system without the need to radically reconfigure the existing or remaining devices.

At the core of the integrated automotive repair shop system 10 is the shop management computer 18, configured to run a shop management program. The shop management program handles the storage and maintenance of all information related to repair orders, both those currently active, and those which have already been completed. To allow for the addition of computerized diagnostic and repair systems from different manufacturers, the shop management program does not need to be capable of understanding the information stored within each data packet. Rather, the shop management program and each computerized diagnostic and repair system is provided with a set of function calls and display control allocation procedures designed to access and display the stored results through interaction with the interconnected computerized devices which originally generated them. These function calls to the network interface programs of the computerized devices include:

Request Task Printout

Requests that a computerized diagnostic or repair system produce a printout of the results of a completed task. The shop management program passes a stored data packet associated with the completed task to the appropriate network interface program, and a printout of the results is produced by that computerized device. The printout may be directed to an attached diagnostic report printer 40 or over the network 20 to the repair order printer 38.

Request Task Display

Requests that a computerized diagnostic and repair system display a visual representation of the results produced by a completed task. The shop management program passes a stored data packet associated with the completed task through the appropriate network interface program to the diagnostic and repair system which generated the data, and simultaneously allocates a portion of the display associated with the management program to control of the diagnostic and repair system. The stored data packet is interpreted by the appropriate diagnostic and repair system, which then controls the allocated portion of the display to present the data in the appropriate format. The allocated portion of the display is controlled by the diagnostic and repair system which transfers specific software object modules and display commands through the network interface to provide the proper data display, or to produce a data printout at an associated printer.

Get Task Data Packet

Requests that the computerized diagnostic and repair system transfer the results of a completed repair or diagnosis to the shop management program in the form of a data packet. This function is called by the shop management program whenever a Signal Task Change function is activated by a network access program.

As is readily seen, the shop management program is not configured to directly interpret the contents of the data packets provided to it for storage by the computerized diagnostic and repair systems. Rather, if access to the information contained within the data packets is needed, the shop management program reads a header block associated with the data to identify the computerized device which created it, and then either transfers the data back to the computerized device or makes the data available through remote access to the computerized device, requesting either a printout or a display of the contents. If a printout is requested, it may be produced by the computerized device which created the data at either a remote printer or at a printer connected to the computer running the shop management program. Similarly, if display of the transferred data is requested, the shop management program will allocate a portion of the display associated with the shop management computer to control of the computerized device which created the data. The computerized device will interpret the data stored in the packet, and assume control of the allocated portion of the display to properly present the data in a format similar or identical to that which would be displayed on the computerized device itself. Control of the allocated portion of the display is maintained by the computerized device through the transfer of software object modules and data over the network. These software object modules may either be run on the computerized device which then remotely controls the allocated portion of the display, or they may be run by the shop management program itself. In either case, the shop management program is not configured to directly interpret for printout or display the data stored by the computerized devices. As such, numerous computerized devices, from different manufacturers, and each having different data formats, may be connected to the network without difficulty, provided each computerized device conforms to the network standards for data and software object module transfer. Accordingly, the incorporation of a vast variety of computerized diagnostic and repair systems from different manufacturers is greatly simplified through the use of the network interface programs and object protocols described herein.

Described below in detail is the interaction between the several computerized diagnostic and repair systems of the embodiment of the present invention shown in FIG. 1.

The computerized engine analyzer system 12 comprises an engine analyzer computer 46, a standard keyboard 48 or other input device, a analysis display screen 50 such as a CRT, and specialized analyzer components 52. A typical computerized engine analyzer is the Universal Service Platform manufactured by SPX Corporation of Kalamazoo, Mich. During use, an operator using the computerized engine analyzer 12 initializes the system as required by the manufacturer, and is prompted on the analysis display screen 50 to input a repair order number. The repair order number is preferably entered directly, but one skilled in the art will recognize that it may be selected from a list or menu of available or related repair orders presented to the operator. The repair order number is then communicated through the network interface function call set forth above to the shop management computer 18, which returns to the engine analyzer computer 46 the associated customer and vehicle information. The returned customer and vehicle information is in turn utilized by the engine analyzer computer network interface program to retrieve needed information stored in the interconnected informational databases or other components of the integrated automotive repair shop system. This related information includes, but is not limited to, the make, model, year, and engine type of the vehicle to be analyzed, the results of previous engine analysis on this vehicle, current manufacturers engine specifications, and any technical bulletins issued for the vehicle.

The retrieved and accessed information is displayed for viewing and verification by the operator on the analyzer display screen 50. In practice, the remaining steps of establishing the appropriate connections between the vehicle undergoing analysis and the specialized analyzer components 52, and the performance of the various procedures required to complete the desired analysis are well known. Once the engine analysis is complete, the engine analyzer computer 46 receives input from the specialized analyzer components 52, and displays the results of the analysis on the analysis display screen 50. If a diagnostic report printer 40 is connected to the engine analyzer computer 46, the operator may request a printout of the results. As set forth above, upon completion of the analysis, the network interface program signals the shop management computer, then communicates a data packet containing the analysis results to the shop management computer for storage.

In addition to the standard function set forth above, the engine analyzer network interface program may include a number of specialized functions. These specialized functions allow the shop management program or other networked computerized devices to extract detailed task information from the engine analyzer system. These specialized network interface function calls may be accessed during the processing of a task by the engine analyzer system, in which case current information will be returned, or the requesting device may supply the engine analyzer network interface with a data packet from a previous repair order, requesting that information be extracted from the supplied data packet for either printout or display at the requesting device as described above.

The initial operations of the computerized diagnostic system 1 are similar to the computerized engine analyzer 12. The computerized diagnostic system 1 comprises a diagnostic computer 2, a standard keyboard or input device 3, a diagnostic system display screen 4 such as a CRT, and one or more specialized diagnostic testing devices 5 and 6 such as a scanner or portable 5-Gas Emissions Analyzer. A typical computerized diagnostic system is the Vetronix Diagnostic Workstation manufactured by Vetronix Corporation of Santa Barbara, California. During use, the operator initializes the specialized diagnostic testing devices as required by the manufacturer, and is prompted on the diagnostic system display screen 4 to input a repair order number. The repair order number is preferably entered directly, but one skilled in the art will recognize that it may be selected from a list or menu of available or related repair orders presented to the operator. The repair order is then communicated by the network interface program set forth above to the shop management computer 18, which returns to the computerized diagnostic system 1 the associated customer and vehicle information, including any tasks to be completed. The returned customer and vehicle information, is in turn utilized by the diagnostic workstation network interface program to retrieve related information stored in the linked informational databases or other components of the integrated automotive repair shop system. This related information includes, but is not limited to, the make, model, year, engine, and fuel system type of the vehicle to be analyzed, the results of previous diagnostic operations performed on the vehicle, the current manufacturer's specifications for the vehicle system to be analyzed, any relevant service procedures for the vehicle, and any relevant technical bulletins issued for the vehicle.

The retrieved and accessed information is displayed for viewing and verification by the operator on the diagnostic system display screen 4. In practice, the remaining steps of establishing the appropriate connections between the vehicle undergoing analysis and the specialized diagnostic testing devices 5 and 6, and the performance of the various procedures required to complete the desired analysis are well known. Once the diagnostic operations are complete, the computerized diagnostic system 1 receives input from the specialized diagnostic testing devices 5 and 6, and displays the results of the diagnostic operations on the diagnostic system display screen 4. If a diagnostic report printer 40 is connected to the computerized diagnostic system 1, the operator may request a printout of the results. As set forth above, upon completion of the diagnostic operations, the network interface program signals the shop management computer, then communicates a data packet containing the diagnostic operation results to the shop management computer for storage.

In addition to the standard function set forth above, the computerized diagnostic system network interface program includes a number of specialized functions. These specialized functions allow the shop management program or other networked computerized devices to extract detailed task information from the computerized diagnostic system. These specialized network interface function calls may be accessed during the processing of a task by the computerized diagnostic system, in which case current information will be returned, or the requesting device may supply the computerized diagnostic system network interface with a data packet from a previous repair order, requesting that information be extracted from the supplied data packet for either printout or display at the requesting device as described above. The following specialized access functions are illustrative examples of the function calls supported by the diagnostic workstation network interface program to extract information from a data packet:

Get Equipment Used
   Returns an identification number for the equipment used to complete an identified task.

Get Equipment Info
   Returns information about the equipment used to complete an identified task, including the equipment type, the equipment identification number, software identification, software version numbers, calibration schedule, preventative maintenance schedule, repair history, replacement schedule, and any upgrades performed.

Get Task Status
   Returns the status of any task currently in progress, and may be used to determine the steps to be completed.

Get Diagnostic Trouble Codes
   Returns diagnostic trouble codes read from the vehicle on-board computers.

Get Parameter Data
   Returns parameter data read from the vehicle on-board computer.

Get Emissions Data
   Returns emissions data read from the emissions analyzer connected to the diagnostic system.

Get Sample Data
   Returns sample data acquired by a data acquisition device connected to the diagnostic system.

List Tests Performed
   Returns a list of the tests performed by the equipment for a given repair order number.

Request Test Results
   Returns an indicator of whether or not each test performed by the equipment for a given repair order number was successful.

Employing the specialized functions set forth above, detailed information about a task performed by the computerized diagnostic system may be extracted from a diagnostic test data packet and presented to a technician or customer for review.

The initial operations of the computerized wheel alignment system 14 and the computerized brake diagnostic system 16 are similar to those of the computerized engine analyzer 12. The computerized wheel alignment system 14 comprises an alignment computer 54, a standard keyboard or input device 56, an alignment display screen 58 such as a CRT, and the specialized alignment measuring devices 60A–60D. A typical computerized alignment system is Model P411 manufactured by Hunter Engineering Company of Bridgeton, Miss. During use, the operator initializes the computerized alignment system 14 as required by the manufacturer, and is prompted on the alignment display screen 58 to input a repair order number. The repair order number is preferably entered directly, but one skilled in the art will recognize that it may be selected from a list or menu of available or related repair orders presented to the operator. The repair order number is then communicated through the network interface functions set forth above to the shop management computer 18, which returns to the alignment computer 54 the associated customer and vehicle information, including any task to be completed. The returned customer and vehicle information is utilized by the alignment computer network interface program to retrieve related information stored in the linked informational databases or other computerized components of the integrated automotive repair shop system. This related information includes, but is not limited to, the make, model, year, and suspension type of the vehicle to be analyzed, the results of previous wheel alignments performed on the vehicle, current manufacturers alignment specifications, and any relevant technical bulletins issued for the vehicle.

The retrieved and accessed information is displayed for viewing and verification by the operator on the alignment display screen 58. In practice, the remaining steps of establishing the appropriate connections between the wheels of the vehicle and the specialized alignment measuring devices 60A–60D, and the performance of the various procedures required to complete the alignment measurements are well known. Once the alignment is completed, the alignment computer 54 receives input from the specialized alignment measuring devices 60A–60D, and displays the results of the alignment on the alignment display screen 58. If a diagnostic report printer is connected to the alignment computer, the operator may request a printout of the results. As set forth above, the network interface program is utilized to signal the shop management computer 18 that the current task has been completed, and the alignment results are then communicated to the shop management computer in an alignment data packet for further processing and storage.

The network interface program of the computerized wheel alignment system includes a number of specialized functions in addition to the standardized function set forth above. These specialized functions allow the shop management program or other computerized devices operating on the network to extract detailed task information from the wheel alignment system. The shop management program may call the specialized network interface program functions during the processing of a task by the wheel alignment system, in which case current information will be returned, or the shop management program may supply an alignment data packet from a previously completed repair order to the aligner network interface program, requesting that information be extracted from the supplied data packet for either printout or display at the shop management program display as described above. The following specialized data access functions are illustrative examples of the function calls supported by the alignment network interface program to extract information from a data packet:

Get Actual Technician

Returns an identifier for the technician who performed an identified task.

Get Technician Notes

Returns the text of any notes or comments added to the repair order by an identified technician.

Get Equipment Used

Returns an identification number for the equipment used to complete an identified task.

Get Equipment Info

Returns information about the equipment used to complete an identified task, including the identification number, the equipment type, calibration schedule, preventive maintenance schedule, repair history, replacement schedule, and any upgrades performed.

Get Task Time

Returns the standard time required to complete an identified task.

Get Location

Returns the service bay identification number where an identified piece of equipment is located.

Request Vehicle Photo List

Requests a list of stored photographs related to an identified vehicle, the returned list includes a unique identification number and description for each photograph contained therein.

Request Vehicle Photo

Provided with a photograph identification number, this function returns the identified photographic image in a format suitable for viewing on a display screen.

Request Vehicle Video List

Requests a list of video recordings related to an identified vehicle, the returned list includes a unique identification number and description for each video recording contained therein.

Request Vehicle Video

Provided with a video recording identification number, this function returns the identified video recording in a format suitable for viewing on a display screen.

Get Inspection Results

This function returns any completed inspection results for an identified repair order.

Get Alignment Type

This function returns the type of alignment performed for an identified repair order.

Get Task Status

This function returns the status of any task currently in progress, and may be used to determine the steps which remain to be completed.

Get Kits Used

Provided with a repair order number, this function returns information related to any repair kits (such as shims) used in completing the tasks associated with the identified repair order.

Get Features Used

Given a repair order number, this function returns information detailing which features of the wheel alignment system were used to complete the tasks associated with the identified repair order. Employing the specialized functions set forth above, detailed information about a task performed by the computerized wheel alignment system may be extracted from an alignment data packet and presented to a technician or customer for review.

Similar to the engine analyzer system and the wheel alignment system, the computerized brake diagnostic system 16 comprises an brake computer 62, a standard keyboard or input device 64, a diagnostic display screen 66 such as a CRT, and a specialized brake testing unit 68. A typical brake diagnostic system is Model P400 manufactured by Hunter Engineering Company of Bridgeton, Miss. During use, the operator initializes the computerized brake diagnostic system 16 as required by the manufacturer, and is prompted on the diagnostic display screen 66 to input a repair order number. The repair order number is preferably entered directly, but one skilled in the art will recognize that it may be selected from a list or menu of available or related repair orders presented to the operator. The repair order number is then communicated by the network interface program functions set forth above to the shop management computer 18, which returns to the brake computer 62 the associated customer and vehicle information, including any tasks to be completed. The returned customer and vehicle information is in turn utilized by the network interface program to retrieve related information stored in the linked informational databases or other components of the integrated automotive repair shop system. This related information includes, but is not limited to, the make, model, year, and brake types of the vehicle to be analyzed, the results of previous wheel alignments and brake tests performed on the vehicle, the current manufacturers brake specifications, and any relevant technical bulletins issued for the vehicle.

The retrieved and accessed information is displayed for viewing and verification by the operator on the diagnostic display screen 66. In practice, the remaining steps of establishing the appropriate connections between the vehicle brakes and the specialized brake testing unit 68, and the performance of the various procedures required to complete the brake diagnostics are well known. Once the brake diagnostics are completed, the brake computer 62 receives input from the specialized brake testing unit 68, and displays the results of the brake tests on the diagnostic display screen 66. If a diagnostic report printer 40 is connected to the brake computer, the operator may request a printout of the results. As set forth above, the network interface program associated with the brake computer signals the shop management computer 18 that the task has been completed, and the brake diagnostic results are then communicated to the shop management computer in a brake tester data packet for further processing and storage.

The network interface program of the computerized brake diagnostic system may include a number of specialized functions in addition to the standardized function set forth above. These specialized functions allow the shop management program or other computerized device operating on the network to extract detailed task information from the brake diagnostic system. The shop management program may call the specialized network interface program functions during the processing of a task by the brake diagnostic system, in which case current information will be returned, or the shop management program may supply a brake tester data packet from a previous repair order to the network interface, requesting that the information be extracted from the supplied data packet for either printout or display on an allocated portion of the shop management program display device. The following specialized functions are examples of functions which may be supported by the brake diagnostic system network interface program:

Get Actual Technician

Identifies the technician who performed an identified task.

Get Technician Notes

Returns the text of any notes or comments added to the repair order by the technician.

Get Equipment Used

Returns an identification number for the equipment used to complete an identified task.

Get Equipment Info

Returns information about the equipment used to complete an identified task, including the identification number, the equipment type, calibration schedule, preventive maintenance schedule, repair history, replacement schedule, and any upgrades performed.

Get Task Time

Returns the standard time required to complete an identified task.

Get Location

Returns the service bay identification number where the identified equipment is located.

List Tests Performed

Returns a list of the tests performed by the equipment for an identified repair order number.

Request Test Status

Returns an indicator of whether or not each test performed by the equipment for an identified repair order number was successful.

Request Test Conclusions

Returns a description of the results of each test performed (i.e. "Passed", "Failed", "Insufficient Adhesion", etc.) by the equipment for an identified repair order. The results are segregated by axle and wheel where appropriate.

Get Static Weight

Returns the static weight of the vehicle associated with an identified repair order.

Get Plate Status

Returns an indicator of whether the equipment plates are currently functional.

Get Plate Components

Returns a list of the current equipment plate components (i.e. Brake plates, Suspension Plates, Side Slip Meter).

Get Axle Weights

Returns the front and rear axle weight of a vehicle associated with an identified repair order.

Get Axle Braking Force

Returns four values for the axle braking forces measured at each corner of a vehicle associated with an identified repair order.

Get Front/Rear Imbalance Result

Returns an indicator of success or failure for the front or rear imbalance test of a vehicle associated with an identified repair order.

Get Front/Rear Imbalance Measurement

Returns the front to rear braking imbalance measurement as a percentage for a vehicle associated with an identified repair order.

Get Front/Rear Imbalance Ideal

Returns the ideal value for the front to rear braking imbalance for a vehicle associated with an identified repair order.

Get Front/Rear Imbalance Minimum

Returns the minimum acceptable value for a front to rear breaking imbalance force for a vehicle associated with an identified repair order.

Get Front/Rear Imbalance Maximum

Returns the maximum acceptable value for a front to rear breaking imbalance force for a vehicle associated with an identified repair order.

Get Left to Right Result

Returns an indication of the success or failure of the left to right braking imbalance test for a vehicle associated with an identified repair order.

Get Left to Right Imbalance Measurement

Returns the left to right braking imbalance measurement as a percentage for a vehicle associated with an identified repair order.

Get Left to Right Imbalance Standard

Returns the standard values for the left to right braking imbalance for a vehicle associated with an identified repair order.

Get Deceleration Result

Returns an indication of the success or failure of the deceleration test for a vehicle associated with an identified repair order.

Get Deceleration Measured

Returns the measured deceleration as a percentage of gravity for a vehicle associated with an identified repair order.

Get Deceleration Min./Max.

Returns the minimum and maximum deceleration as percentages of gravity for a vehicle associated with an identified repair order.

Get Velocity Result

Returns an indication of success or failure for the velocity test of a vehicle associated with an identified repair order.

Get Velocity Measured

Returns the measured velocity of a vehicle associated with an identified repair order.

Get Velocity Min./Max.

Returns the minimum and maximum velocities of a vehicle associated with an identified repair order.

Get Wheel Strength

Returns a wheel strength value for each wheel of a vehicle associated with an identified repair order.

Get Manual Fail Result

Returns the results of the manual fail test for a vehicle associated with an identified repair order.

Get Adhesion Specifications

Returns the adhesion specifications (marginal and failed) for each wheel of a vehicle associated with an identified repair order.

Get Adhesion Measurements

Returns the adhesion measurements for each wheel of a vehicle associated with an identified repair order.

Get Damping Specifications

Returns the damping specifications (marginal and failed) for each wheel of a vehicle associated with an identified repair order.

Get Damping Measurements

Returns the damping measurements for each wheel of a vehicle associated with an identified repair order.

Get Side Slip Front

Returns the front side slip measurement for a vehicle associated with an identified repair order.

Get Side Slip Rear

Returns the rear side slip measurement for a vehicle associated with an identified repair order.

Employing the specialized functions set forth above, detailed information about a task performed by the computerized brake diagnostic system may be extracted from a brake testing data packet and presented to a technician or customer for review.

As thus described above, it is seen that the embodiment of the present invention shown in FIG. 1 is able to facilitate the exchange of information between networked computerized diagnostic and repair devices found in an automotive repair shop and a shop management system through the use of standardized and specialized network interface program function calls. Although the above described embodiment includes only a single shop management system for the entry of customer data, and three computerized diagnostic and repair devices, it will be readily understood by one skilled in the art that numerous variations are possible. For example, customer data may be entered into the shop management system from a number of networked data entry terminals positioned at the garage entrance, allowing service personnel to attend to customers and their vehicles as the drive in. Additional computerized diagnostic and repair devices may be interconnected into the network, each including a computer modified by a network interface program providing the standard access and display functions set forth above along with a number of specialized access functions specific to the device. Similarly, additional information databases may be added to the system to provide access to information not already available. For example, the system may be expanded to incorporate billing and mailing functions, and to automatically notify customers when their vehicles are due for a recommended maintenance or manufacturers recall.

Figure 2:
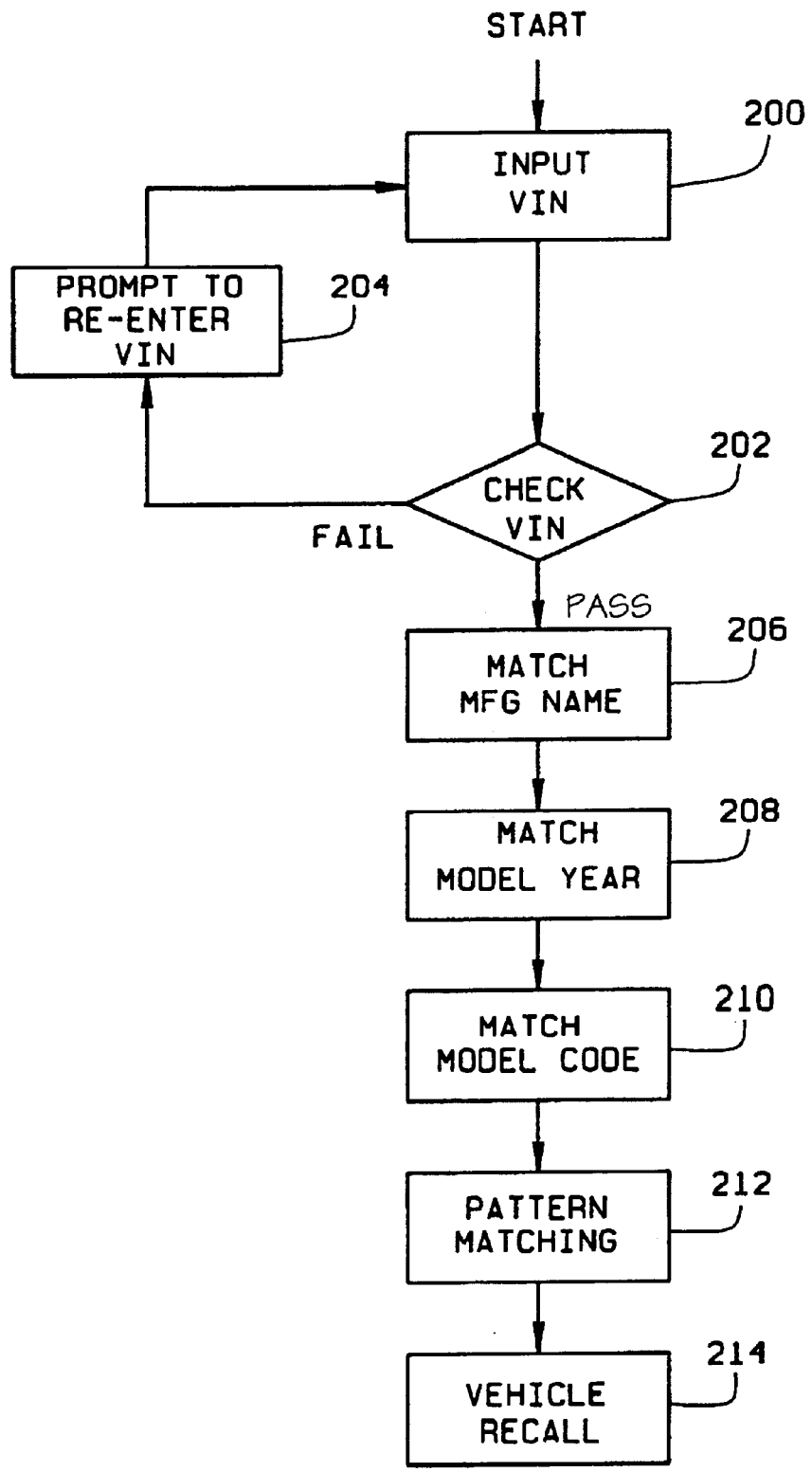
FIG. 2 is a flow chart showing the steps traversed by the vehicle identification module in extracting information from the vehicle identification number.

Referring now to FIG. 2, a flow chart is shown of the specific steps traversed by the shop management program employed in the preferred embodiment of FIG. 1, to extract the various vehicle descriptive parameters from an operator entered VIN number. During the entry of customer information into the shop management program, the operator is prompted to enter either the VIN or the make, model, and year of the vehicle. To reduce the chances of operator error in describing the vehicle, the shop management program incorporates a VIN recall module to extract the make, model, and year information directly from the VIN. The operator inputs the VIN (Block 200) preferably either by typing the alpha-numerical sequence on a keyboard or by scanning a bar-code with a scanning device. The VIN recall module performs a validity check (Block 202) to determine if the VIN was properly entered. If the input VIN is not recognized as a standard VIN, the operator is prompted to re-enter the number or to manually enter the vehicle information (Block 204). After receiving a standard VIN, the VIN recall module matches the first three digits of the VIN to a manufacturer identification code to determine the vehicle manufacturer (Block 206). Next, the tenth digit of the VIN is extracted to determine the model year of the vehicle by comparing it against a year-code table (Block 208). Using the manufacturer name and model year determined in the previous steps, a subset of the manufacturer's model code table is identified to contain the appropriate vehicle model (Block 210). The vehicle model code is determined based upon the fourth through the eighth digits in the VIN and compared with the subset of the manufacturer's model code table previously identified to determine the vehicle model name (Block 212). As is seen above, the vehicle year, make, and model is quickly and easily extracted from the input VIN (Block 214), reducing the chances of operator error. This information, along with the entire VIN number is then organized by the shop management program into a repair order as set forth above. One skilled in the art will recognize that there are other, equally suitable, ways of identifying a vehicle in a repair order. For example, a proprietary database may be established wherein each vehicle make, model, and year is assigned a specific identification code. The individual code corresponding to the vehicle associated with a repair order would then become part of the repair order, allowing each component of the system to extract the detailed vehicle information from various databases using the individual code as an index.

Figure 3:
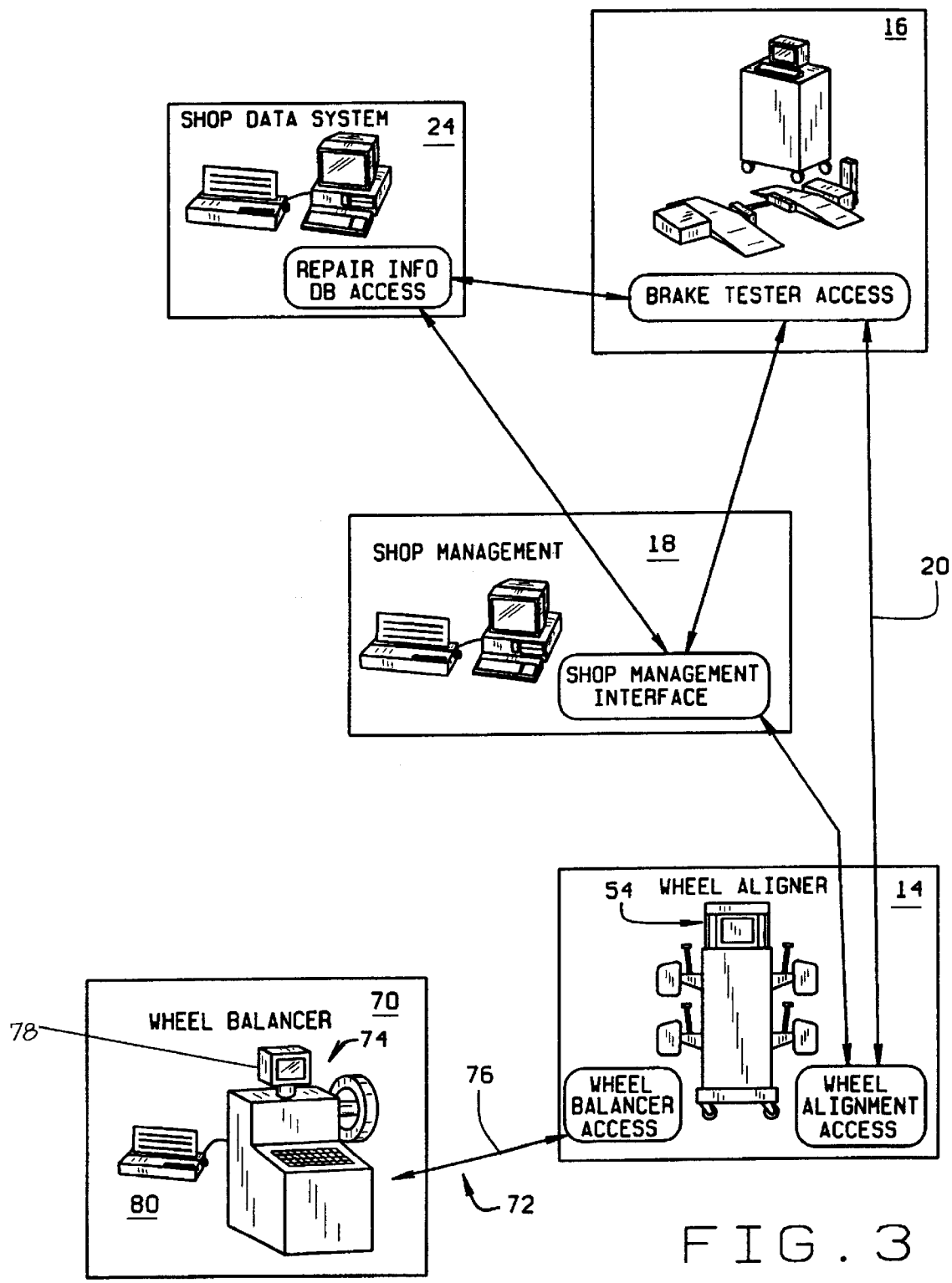
FIG. 3 is a schematic diagram of the networked components of the integrated automotive repair shop system illustrating the interconnection of a non-computerized measurement device.

Referring now to FIG. 3, a non-computerized digital measuring device shown generally at 70 is connected to the integrated automotive repair shop system 10 of the present invention. The measuring device 70 is not connected directly to the network 20 interconnecting the computerized diagnostic/repair devices and the shop management system 10, but rather is preferably linked via a standard serial cable 72 or similar data connection to any computer in the repair shop system 10. However it is preferred that a measuring device 70 which performs functions closely associated with the operation of a computerized diagnostic or repair system 11 be linked directly to the computer of that device. For example, a wheel balance measurement device 74 is closely associated with the function of a computerized wheel alignment device 14, and accordingly is shown in FIG. 3 as linked directly to the alignment computer 54 by a standard RS-232 serial cable 76. The measurement device 70 may include a small liquid crystal display (LCD) 78 for displaying measurement information to the technician and for providing status reports. Additionally, a measurement report printer 80 may be attached to, or incorporated into the measurement device 70 for producing a printout of any measurements taken.

Upon occasion, the shop management program or computerized diagnostic and repair system 11 will need to retrieve information from the measurement device 70 through the serial connection 72. Accordingly, a measurement device access program notifies the computer to which the measurement device 70 is connected, allowing the transfer of information. The shop management program or other computerized device interconnected on the network is capable of calling upon a set of standard functions incorporated into the measurement device access program. These standard functions provided in every measurement device access program include:

Send Repair Order and Task ID

Sends the current repair order number and task identifier to the measurement device for display on the measurement device LCD.

Send Vehicle ID String

Sends a text message for display on the measurement device LCD which identifies the vehicle on which the measurements are to be taken.

Return Task Complete

Query the measurement device to determine if a work order or task has been completed.

Return Task Data Packet

Request the measurement device organize the results of a measurement into a measurement data packet, and transfer the data packet to the shop management program via a network interface program for incorporation into a repair order.

Request Task Printout

Request the measurement device to produce a printout of the current measurement results.

Request Task Display

Request that the measurement device produce a visual display of the current measurement results. This visual display is produced on the display screen associated with the shop management computer or on the display screen of the computerized diagnostic device to which the measurement device is linked.

Is Device Attached

Returns and indicator of whether or not the device is connected to the system via a serial port.

Get Device Identifier

Returns a text string uniquely identifying the measurement device.

This text string includes the make, mode and serial number of measurement device.

In addition to containing the standardized functions set forth above, a measurement device access program may contain specialized functions related to the particular measurements the device is configured to perform. For example, the wheel balancer measurement device is accessed through a wheel balance measurement access program which includes the following specialized functions:

Get Wheel Dimensions

Returns the dimension of the wheel being measured.

Get Balance Type

Returns the type of balance used (static, clip-on, adhesive, or patch).

Get Imbalance Info

Returns the imbalance measurement before and after correction.

Get Weight Sizes Used

Returns the type of weights applied to correct the imbalance.

Get Rim Runout

Returns the left and right rim runout (lateral and radial).

Get Force Variation

Returns the wheel/tire assembly force variation.

Get Tire Force Variation

Returns the tire component of the force variation.

Get Force Variation After Match

Returns the wheel/tire assembly force variation after rim-to-tire matching has been performed.

Get Tolerances

Returns the runout and force variation tolerance levels used.

It will be readily understood that additional digital measuring devices may be connected through standard serial connections or other data links to the computers associated with the computerized diagnostic and repair devices. Each digital measuring device requires a separate measurement device access program providing at least the standard function calls set forth above. Additional specialized function calls may be provided as needed for interconnected computerized devices to retrieve specific measurements and data from the measuring device.

Operation of the integrated automotive repair shop system of the present invention is relatively straightforward, greatly enhancing the performance and quality of automotive service procedures performed. Upon the arrival of a customer at a repair shop employing the integrated system of the present invention, the customer's name is input into the shop management system either directly or through a data entry terminal. If the customer has previously brought a vehicle to the repair shop for service, the stored customer information will automatically be retrieved from records contained in a customer database. The operator will need only verify the information as current. If the information is out-dated, or the customer is a new customer, the operator must enter the customer's address and telephone number into the system to create a new entry in the customer database. The operator next identifies the customer's vehicle by entering an identification code. This code is preferably a standard Vehicle Identification Number (VIN), but those skilled in the art will recognize that a proprietary code could be used to identify the various makes, models and years of vehicles to be serviced. If the identification code is a standard VIN, and the VIN is recognized by the shop management program as a correctly entered VIN, the vehicle make, model, and year information is automatically extracted from the VIN. If the VIN is not recognized, the operator must manually enter this information. Finally, the operator is required to input to the shop management program one or more repair tasks to be completed on the vehicle. A repair task may range from a simple vehicle inspection to a complicated engine rebuild or replacement procedure.

Upon the completion of the operator entry stage, the shop management program organizes the input data into a repair order, and generates a repair order number which will be used for identifying the repair tasks performed. The vehicle is then taken to the back shop area, and the appropriate repair tasks begun. If a repair task involves the use of a computerized diagnostic or repair system, the operator of that device is only required to input the repair order number into the computerized system either directly or by selection from a menus system to access all the information stored in the repair order. In addition, the integrated automotive repair shop system is capable of automatically searching any number of linked electronic databases to obtain information relevant to the repair task to be performed. This relevant information may include technical service bulletins, manufacturer's specifications, parts inventory, or vehicle schematics. Any information located by the search is either displayed for the technician on a display screen associated with the computerized system, or listed for selective viewing. The technician, utilizing any information located, then completes the required services procedures associated with the repair task. The results are electronically recorded by the computerized diagnostic and repair systems, displayed for the technician, and organized into a data packet for transfer through the network interface to the shop management computer. The shop management computer receives the data packet, links it with the appropriate repair order, and stores the information for later retrieval.

If the information stored in the data packet is needed at a later point, the repair order is retrieved from storage by the shop management program, and the data packet extracted. A header attached to each data packet identifies the computerized diagnostic and repair system which generated the data contained in the packet. The data packet is then transferred through the network interface to the identified computerized diagnostic and repair system. The shop management program then requests that the computerized system either produce a printout of the results contained in the data packet or allocated control of a portion of the display screen associated with the shop management system to the computerized diagnostic and repair system to allow it to display the information contained in the data packet. The computerized diagnostic and repair system interprets the data contained in the data packet, and either directly controls the allocated portion of the display to present the data, or transfers software object modules via the network to the shop management program for execution thereby to display the data.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A networked automotive repair shop management system for processing automotive service orders and transferring vehicle information, comprising:

at least one service order input interface configured to receive service order information from an operator;

a service order processor communicatively connected to each of said service order input interfaces to receive service order information, and communicatively connected to at least one informational database for storing and retrieving data, said service order processor further configured to generate a service order in response to received service order information, said service order including at least one service procedure to be completed;

at least one access interface in communication with said service order processor;

at least one computerized automotive service device communicatively connected to said service order processor through said at least one access interface to receive a service procedure, said computerized automotive service device configured to transmit service data to said service order processor through said at least one access interface upon the completion of a service procedure;

said service data includes procedure results and instruction modules, said instruction modules configured to interpret and display said service procedure results; and said service order processor modifying said generated service order in response to said received service data.

2. The networked automotive repair shop management system of claim 1 wherein said service order processor is configured to process said instruction modules to interpret and display said service procedure results.

3. The networked automotive repair shop management system for processing automotive service orders and transferring vehicle information of claim 1 wherein said at least one access interface in communication with said service order processor is configured to provide a set of standardized functions for bi-directional data transfer.

4. The networked automotive repair shop management system for processing automotive service orders and transferring vehicle information of claim 1 wherein said at least one access interface in communication with said service order processor is configured to facilitate the addition of a second at least one computerized automotive service device.

5. The networked automotive repair shop management system for processing automotive service orders and transferring vehicle information of claim 1 further including a second access interface, said second access interface configured to facilitate data transfer between said service order processor and said at least one informational database, and between said at least one computerized automotive service device and said at least one informational database.

6. The networked automotive repair shop management system for processing automotive service orders and transferring vehicle information of claim 5 wherein said second access interface is configured to facilitate the addition of a second at least one informational database.

7. A method of integrating automotive repair shop operations between at least one computerized service device and a shop management system the method comprising the steps of:

for each customer, inputting customer information and at least one service request into said shop management system:

identifying a vehicle associated with each customer, said vehicle identified by make, model, and year information;

generating a service order, said service order assigned a service order number, and including as service order information said input customer information, said vehicle make, model, and year information, and at least one service procedure corresponding to said service request;

inputting said service order number into said at least one computerized service device. said computerized service device responsive to the input of said service order number to request and receive said service order information from said shop management system over a communications link:

extracting stored information related to said service order from an interconnected electronic database;

displaying said service order information and said extracted stored information for operator review on said at least one computerized service device;

completing, on said at least one computerized service device said at least one service procedure, responsive to said completion, said computerized service device communicating a data packet of results to said shop management system;

incorporating said data packet of results into said service order information within said shop management system;

storing completed service orders in an customer information database linked to said shop management system; and wherein identifying a vehicle associated with each customer includes inputting a vehicle identifier number at a data entry terminal.

8. The method of integrating automotive repair shop operations set forth in claim 7 wherein said vehicle make, model, and year information is retrieved from a database, said database retrieval indexed by said vehicle identifier number.

9. The method of integrating automotive repair shop operations set forth in claim 7 wherein said vehicle identification number is a standard Vehicle Identification Number, said vehicle identified by make, model, and year information extracted from said Vehicle Identification Number.

10. The method of integrating automotive repair shop operations set forth in claim 9 wherein extracting said vehicle make, model, and year information from said Vehicle Identification Number comprises the steps of:

verifying the correct input of said vehicle identification number;

extracting a manufacturer identification code from said vehicle identification number;

translating said manufacturer identification code to determine said vehicle make;

extracting a model year code from said vehicle identification number;

translating said model year code to determine said vehicle year information;

selecting at least one vehicle model choice based on said vehicle make and said vehicle year information;

extracting a model code from said vehicle identification number; and cross referencing said model code with said selected vehicle model choice to determine said vehicle model.

11. A method of integrating automotive repair shop operations comprising the steps of:

retrieving, on a shop management system, a stored service order;

extracting from said retrieved service order, a data packet of service procedure results;

allocating a portion of a display associated with said shop management system for display of said service procedure results;

receiving from a computerized automotive service device which generated said service procedure results, instruction through a first access interface for interpretation and display of said service procedure results; and displaying, by utilizing said interpretation and display instructions, the contents of said data packet of service procedure results in said allocated portion of said display.

12. A networked automotive repair shop management system for processing automotive service orders, the system comprising:

a data transfer network;

at least one computerized automotive service device communicatively interconnected to said data transfer network, said automotive service device configured with a standardized service device network interface to facilitate the transfer of service data to and from said data transfer network;

a database system communicatively interconnected with said at least one computerized automotive service device by said data transfer network, said database system configured to transfer said service data to and from said data transfer network; and at least one computerized shop management system communicatively interconnected with said automotive service device and said database system by said data transfer network, said shop management system configured to interact with said standard service device network interfaces and said database system to transfer said service data over said data transfer network;

said service data including repair results and at least one software object module, said software object module comprising instructions for interpretation and display of said repair results.

13. In a networked automotive service system, a method including:

generating a repair order using a first computer system, said repair order including at least one service task to be completed;

transferring data contained in said repair order to a computerized automotive service device over a data communications network using a data access interface;

completing said at least one service task to be completed on said computerized automotive service device;

communicating the results of said completed service task to said first computer system over said data communications network using said data access interface;

incorporating said results into said repair order;

storing said repair order in a database system;

subsequent to the storing of said repair order in a database system, retrieving said repair order from said database system for display of said results;

extracting information from said repair order indicative of the computerized automotive service device which created said results;

transferring control of an allocated portion of a display associated with said first computer system to said indicated service device for display of said results;

interpreting said results; and displaying said results in said allocated portion of said display said display controlled by said indicated service device over said data communications network.

* * * * *